F. E. DODGE.
WASHING AMMONIUM SULFATE.
APPLICATION FILED JUNE 19, 1919.
1,321,993.
Patented Nov. 18, 1919.
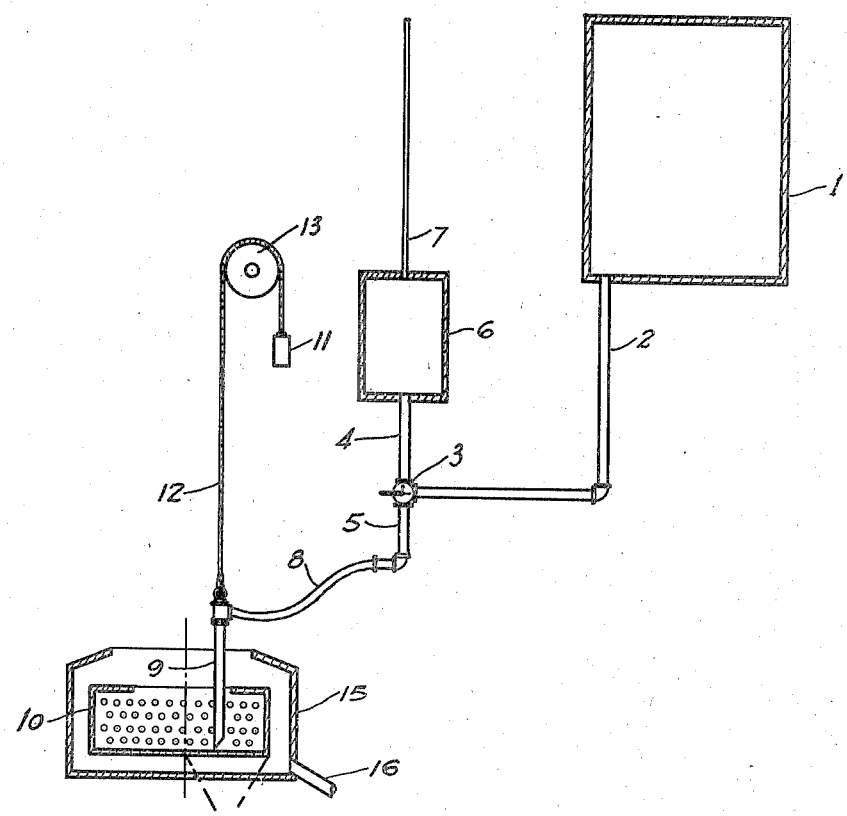
Fig. 1.
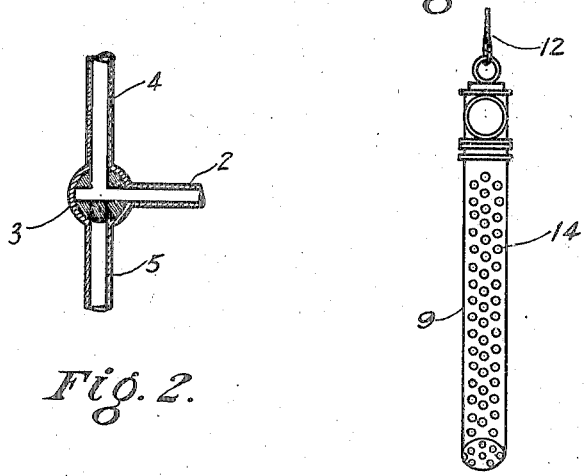
Fig. 2.
Fig. 3.
INVENTOR
Frank E. Dodge
BY
Chas. W. Mortimer
ATTORNEY

UNITED STATES PATENT OFFICE.

FRANK E. DODGE, OF FLUSHING, NEW YORK, ASSIGNOR TO THE BARRETT COMPANY, A CORPORATION OF NEW JERSEY.

WASHING AMMONIUM SULFATE.

1,321,993.      Specification of Letters Patent.     Patented Nov. 18, 1919.

Application filed June 19, 1919. Serial No. 305,390.

*To all whom it may concern:*

Be it known that I, FRANK E. DODGE, a citizen of the United States, residing at 20 South 17th street, Flushing, in the county of Queens and State of New York, have invented certain new and useful Improvements in Washing Ammonium Sulfate, of which the following is a specification.

This invention relates to an improvement in washing ammonium sulfate. The object of this invention is to wash the crystals of ammonium sulfate, after the surplus mother liquor has been removed from the same, with a substantially saturated aqueous solution of ammonium sulfate so as to remove therefrom the adhering mother liquor, leaving the crystals wet with a solution of ammonium sulfate. A further object of the invention is to wash different batches of the crystals with exactly the same amount of solution so as to leave the different batches in the same condition, thereby obtaining greater uniformity of product than has been heretofore obtained.

It is very desirable for the manufacturer of ammonium sulfate to be able to supply the trade with a product which is uniform in character and is not hygroscopic to an objectionable extent. This can be done by this invention because the crystals can be cheaply and uniformly washed without requiring a high degree of skill or care in manipulating the apparatus.

In the usual course of manufacture of ammonium sulfate the ammonia containing gases obtained from the tar extractors in by-product coke oven plants or illuminating gas manufacture are passed through saturators charged with dilute sulfuric acid. The ammonia unites with sulfuric acid to form ammonium sulfate which is precipitated, removed, and the mother liquor is drained off of the ammonium sulfate crystals preferably in a centrifugal machine. The crystals are then washed with a spray of water to remove the remaining mother liquor which still clings to the surfaces of the crystals. This entails losses as a portion of the crystals is dissolved and carried away by the water and the operator merely estimates when the washing operation has been carried far enough, thus causing different batches of the crystals to retain different amounts of impurities. In some instances dilute ammonia liquor is used for washing the salt in the centrifugal, which may leave the salt neutral but is open to the same objection of dissolving the sulfate crystals. Both methods tend to increase the amount of mother liquor made which is a source of trouble and expense.

These defects and objections are overcome by the present invention which will be readily understood from the description in connection with the accompanying drawings in which—

Figure 1 is a view showing somewhat diagrammatically an arrangement of apparatus by means of which the invention may be practised;

Fig. 2 is a detail of the three-way valve, and

Fig. 3 is a detail of the spraying device.

In the drawing, reference character 1 indicates a storage tank for the washing liquor, preferably a saturated solution of ammonium sulfate which may be conveniently obtained, for example, from the ammonium sulfate tank $K^2$ in the operation of the Dodge-Rhodes method for recovering pyridin bases as described in U. S. Patent No. 1,274,998, granted Aug. 6, 1918.

A pipe 2 leads from storage tank 1 to a three way valve 3 which can be set to lead liquid from pipe 2 to pipe 4, or from pipe 4 to pipe 5. The pipe 4 leads to a secondary storage or measuring tank 6 of proper size to hold the requisite amount of liquid to perform one washing operation of the crystals. The tank 6 is so mounted that its top is always below the level of the liquid in tank 1 to insure complete filling of the tank 6 when the valve 3 is turned into the filling position. A vent pipe 7 leads from the top of tank 6 to facilitate the filling and discharging of tank 6. The top of vent 7 extends above the level of liquid in tank 1 to prevent overflow.

A flexible hose 8 connects the pipe 5 to the spray pipe 9 which may be raised or lowered into the basket 10 of the centrifugal machine by means of a counter weight 11 connected to spray pipe 9 by means of a rope or cord 12 which passes over pulley 13. The centrifugal basket 10 is housed in a housing 15 which has a pipe 16 leading from the lower part thereof.

The spray pipe 9, as more clearly shown in Fig. 3, consists of a tube having its lower end closed, and being provided along one side thereof with a series of perforations 14 for the exit of the washing fluid in small streams.

The operation is as follows: The centrifugal basket 10 is charged with a batch of wet ammonium sulfate crystals and the basket is revolved to fling off the surplus liquid. The spray pipe 9 is then lowered into the basket and the valve 3 is turned to the discharging position whereupon all the washing liquid in tank 6 passes through the perforations 14 in pipe 9 and washes the crystals in basket 10. The valve 3 is then turned to the filling position, the pipe 9 is raised by counter weight 11, the washed crystals are removed from the basket 10, and the basket is then charged with a fresh batch of crystals, while the tank 6 is being refilled. In this way all the batch of crystals are washed to the same extent or with the same amount of washing liquid, thereby obtaining a substantially uniform product without any undue loss of material, especially when a substantially saturated solution of ammonium sulfate is used as the washing liquid.

I claim:

1. In a crystal washing apparatus of the class described, in combination, a measuring tank, means for removing surplus liquid from a batch of crystals and means for washing said crystals with a predetermined amount of liquid, said latter means including a valve through which the liquid is first fed to said measuring tank and then to the crystals.

2. In a crystal washing apparatus of the class described, in combination, a measuring tank, a perforated centrifugal basket for removing surplus liquid from a batch of crystals and means for washing said crystals with a predetermined amount of liquid, said latter means including a valve through which the liquid is first fed to said measuring tank and then to the crystals.

3. In a crystal washing apparatus of the class described, in combination, a perforated centrifugal basket for removing surplus liquid from crystals and means for washing said crystals with a predetermined amount of liquid, said means comprising a storage tank, a secondary tank, and a three-way valve which alternately opens communication from said storage tank to said secondary tank and from said secondary tank to said centrifugal basket.

4. In a crystal washing apparatus of the class described, in combination, a perforated centrifugal basket for removing surplus liquid from crystals and means for washing said crystals with a predetermined amount of liquid, said means comprising a storage tank, a secondary tank at a lower level than said storage tank, and a three-way valve which alternately opens communication from said storage tank to said secondary tank and from said secondary tank to said centrifugal basket.

5. A process of washing crystals which comprises drawing the surplus liquid from a number of batches of ammonium sulfate crystals and subsequently washing each batch with substantially the same predetermined quantity of saturated ammonium sulfate solution, whereby uniformity of product is obtained.

6. A process of washing crystals which comprises draining the surplus liquid from batches of ammonium sulfate crystals, measuring predetermined, equal amounts of saturated ammonium sulfate solution, and washing said batches of crystals with the said amounts of said solution.

7. A process of washing crystals which comprises removing the surplus mother liquor from a number of batches of ammonium sulfate crystals of substantially equal volumes by centrifugal force, and subsequently washing each batch with substantially the same predetermined quantity of saturated ammonium sulfate solution, whereby the remaining mother liquor is removed without appreciable loss of the ammonium sulfate crystals.

8. In a crystal washing apparatus of the class described, in combination, means for removing surplus liquid from crystals and means for washing said crystals with a predetermined amount of liquid, said means comprising a storage tank, a secondary tank, and mechanism which opens communication from said storage tank to said secondary tank and simultaneously closes communication from said secondary tank to said surplus liquid removing means and vice versa.

In testimony whereof I affix my signature.

FRANK E. DODGE.